United States Patent

[11] 3,589,028

| [72] | Inventor | William A. Hinton |
| | | Atlanta, Ga. |
| [21] | Appl. No. | 791,376 |
| [22] | Filed | Jan. 15, 1969 |
| [45] | Patented | June 29, 1971 |
| [73] | Assignee | Durand Machinery, Inc. |
| | | Meriwether, Ga. |

[54] METHOD AND APPARATUS FOR DRYING WAXED FRUIT
2 Claims, 9 Drawing Figs.

[52] U.S. Cl. .................................................. 34/85, 34/236
[51] Int. Cl. .................................................. F26b 17/02
[50] Field of Search .......................................... 34/27, 28, 76, 77, 85

[56] References Cited
UNITED STATES PATENTS

| 1,751,472 | 3/1930 | Criqui | 34/28 |
| 1,829,154 | 10/1931 | Post et al. | 34/85 UX |
| 2,078,515 | 4/1937 | Sutherland | 34/28 X |
| 2,627,669 | 2/1953 | Candor | 34/76 X |
| 2,799,947 | 7/1957 | Elwess | 34/77 X |

Primary Examiner—Edward J. Michael
Attorney—Newton, Hopkins & Ormsby

ABSTRACT: A method and apparatus for drying wax fruits wherein the fruit is continuously conveyed through a substantially closed chamber into which warm dry air is introduced at substantially 10 percent relative humidity. The air is circulated across the fruit being conveyed through the enclosed chamber and is removed from the chamber to be introduced into an air-heating and -conditioning unit which reduces the humidity of the air to substantially 10 percent and reintroduces the dried heated conditioned air into the enclosed chamber to recirculate over the waxed fruit being conveyed therethrough. A ramp is provided for engagement with rollers on the conveyor such as to rotate the rollers and the articles of fruit conveyed thereon. A pair of counter rotating brushes are angularly disposed to the rollers on the underside of the conveyor such as to remove wax deposited thereon by the fruit being conveyed.

PATENTED JUN29 1971 3,589,028

INVENTOR
WILLIAM A. HINTON

BY Newton, Hopkins & Ormsby
ATTORNEYS

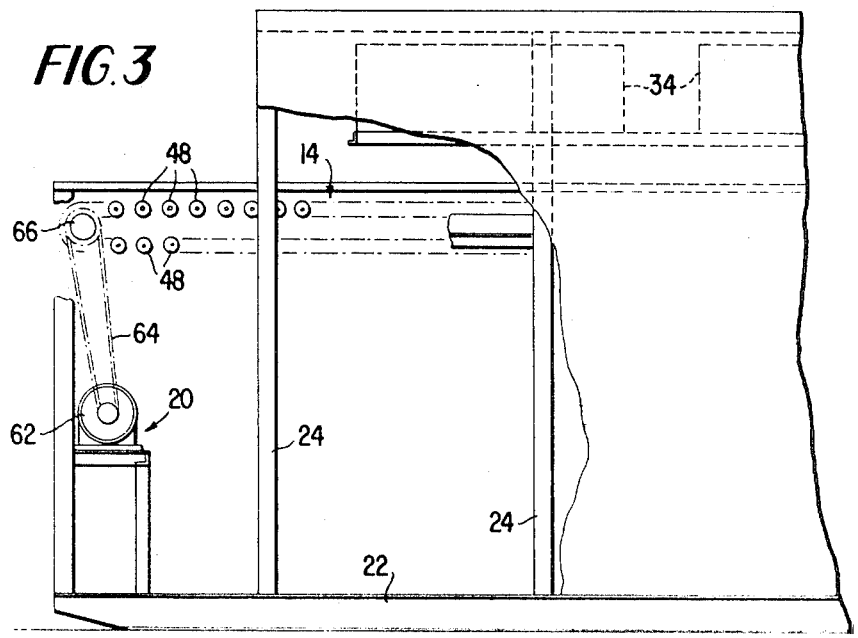
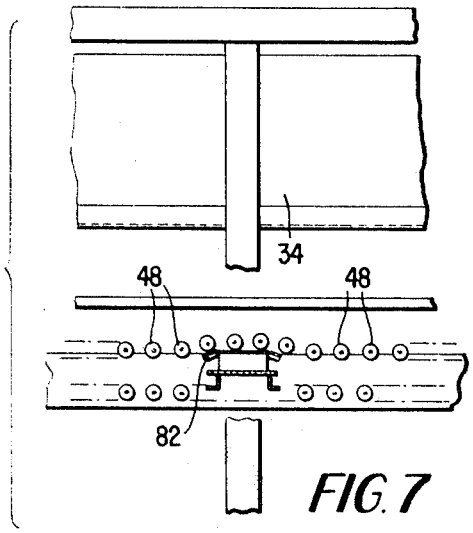
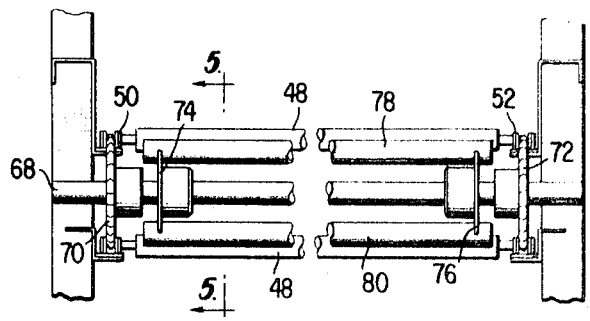
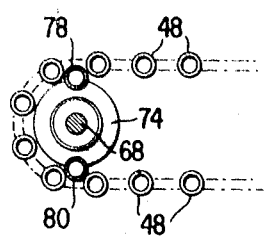
INVENTOR
WILLIAM A. HINTON
BY Newton, Hopkins & Ormsby
ATTORNEYS

PATENTED JUN 29 1971 3,589,028

INVENTOR
WILLIAM A. HINTON

BY Newton, Hopkins & Ormsby
ATTORNEYS 3,589,028

METHOD AND APPARATUS FOR DRYING WAXED FRUIT

BACKGROUND OF THE INVENTION

This invention relates generally to apparatus and method for drying, and more particularly to a method and apparatus for drying waxed fruits with a closed air circuit in which humidity and temperature are constantly controlled. Many prior art devices have been utilized for the drying of waxed fruits. However, such prior art devices although generally satisfactory for some applications have failed to fulfill the needs of the fruits industry at such times as when the temperature and humidity of the outside air have deviated from acceptable limits for drying fruits. The prior art devices have utilized an air-heating unit for heating outside air and circulating said heated outside air across the articles of fruit to be dried. Such devices are quite successful in drying the articles of fruit when the humidity and temperature of the outside air are within acceptable limits. However, at such times when the humidity of the outside air is high, the heating units have been generally unacceptable in that they are incapable of reducing the humidity of the outside air sufficiently to be utilized to effectively dry the articles of fruit. To enable such devices to sufficiently reduce the humidity of the outside air, it would be necessary to utilize extremely expensive and generally complicated air heating and conditioning units which would substantially increase the cost and time necessary for drying the articles of fruit.

SUMMARY OF THE INVENTION

Accordingly, an object of the present invention is to provide a new and improved method and apparatus for drying waxed fruit which is consistently effective regardless of the temperature and humidity of the outside air.

Another object of this invention is to provide a new and improved method of drying waxed fruit which utilizes a closed air circuit which does not require introduction of outside air.

A further object of the instant invention is to provide a new and improved method of drying waxed fruit which is capable of maintaining the humidity of the air being circulated across the waxed fruit at substantially 10 percent relative humidity.

A still further object of the instant invention is to provide a new and improved waxed fruit drier which is inexpensive to manufacture and operate and is capable of functioning effectively regardless of the conditions of the outside air.

Briefly, in accordance with one illustrative embodiment of this invention, the foregoing and other objects are obtained by providing a method of warm air drying wherein a plurality of articles to be dried are conveyed through a substantially closed chamber into which warm dry air is introduced at substantially 10 percent relative humidity to be circulated across the articles to be dried whereby the humidity of the air is increased above the 10 percent, a portion of air is subsequently removed from the chamber and the humidity thereof is reduced to substantially 10 percent so that air may be reintroduced into the chamber to be circulated over the articles to be dried, and the air-circulating and conditioning operations are performed in a continuous manner without the introduction of outside air.

Many other advantages and objects of the present invention will become readily apparent as the foregoing detailed description of the invention unfolds when taken in conjunction with the accompanying drawings.

BRIEF DESCRIPTION OF THE DRAWING

FIG. 3 is a fragmentary exploded view of a portion of FIG. 1 having parts broken away;

FIG. 4 is a fragmentary enlarged view of the conveyor drive;

FIG. 5 is a fragmentary sectional view taken along the line 5-5 of FIG. 4;

FIG. 7 is a fragmentary enlarged view illustrating the turnover mechanism in operation;

DESCRIPTION OF THE ILLUSTRATIVE EMBODIMENTS

Figure 1:
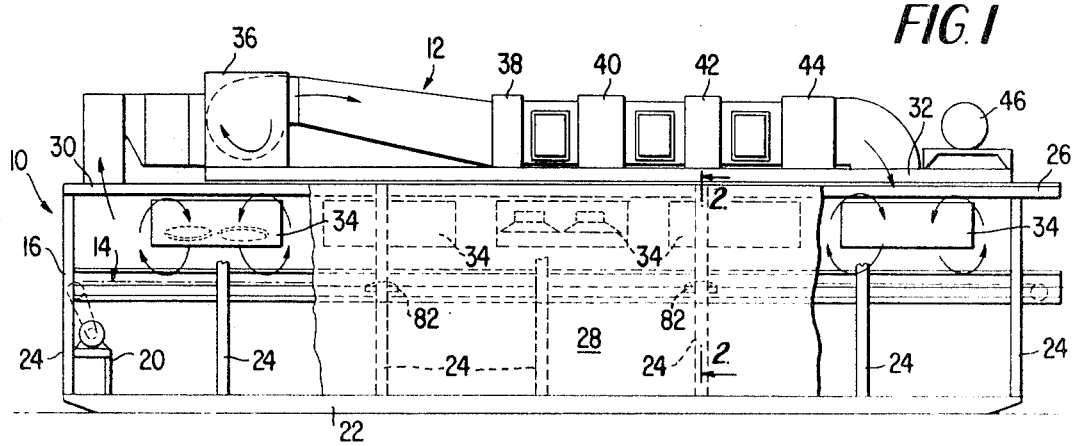
FIG. 1 is a side plan schematic view of the waxed fruit drying apparatus having parts removed.

Referring now to the drawing, wherein like reference characters designate identical or corresponding parts throughout the several views, and more particularly to FIG. 1, whereon the waxed fruit-drying apparatus of the present invention is illustrated as having a substantially closed chamber indicated generally by the reference numeral 10 with an air-drying and conditioning unit 12 secured atop thereof. A conveyor 14 consisting essentially of a plurality of spaced rollers, more fully described hereinafter, has the upper flight thereof at movably mounted within the closed chamber 10 so as to convey fruit from a small ingress opening 16 at one end of the closed chamber to a small egress opening 18 at the opposite end of the closed chamber. Suitable drive means 20 is provided for the conveyor 14.

The chamber 10 having conveyor 14 therein is constructed essentially of a bottom member 22 having a plurality of vertical support members 24 affixed thereto for supporting a top member 26 on the upper extremities thereof. The bottom, sides, top and ends of the chamber 10 are enclosed by panel members 28 of wooden or other suitable material for assuring a generally airtight chamber capable of retaining heated dry air therein. The top of chamber 10 has an egress opening 30 at the fruit inlet end thereof and an ingress opening 32 at the fruit egress opening thereof. Mounted along the top of chamber 10 and in open communication with conveyor 14 are a plurality of buffeting fans 34 which continuously operate to circulate warm dry air across the fruit being conveyed through chamber 10, as shown by the arrows in FIG. 1. Although fans 34 are illustrated only atop conveyor 14, it is within the contemplation of the present invention that fans could also be provided below conveyor 14 to impinge hot dry air upon the bottom surfaces of the fruit being conveyed.

The air-conditioning and heating unit 12 receives the air from chamber 10 by means of opening 30 and conditions the air to reduce the humidity thereof to substantially 10 percent relative humidity while heating the air such that warm dry air may be reintroduced into chamber 10 through opening 32 in the proper condition for drying waxed fruit. Conditioning and heating units 12 consist essentially of 2,200 cubic feet per minute blowers 36 which feed the air into a precooling coil 38 from which it passes into an evaporator coil 40, a preheating coil 42 and a condenser coil 44 prior to being reintroduced into chamber 10 through opening 32. The conditioning units condenses the moisture in the air by refrigeration and rewarms the air by using the heat pump principle. Thermostatically controlled strip heaters may be furnished to provide supplemental heat when such is needed. A compressor 46 is provided adjacent the outlet end of chamber 10 for providing additional air to chamber 10 if it is so desired. As can be seen by the foregoing description the method of the present invention does not require hot air furnaces which create high temperatures and are costly to operate. Drying is accomplished within the drying tunnel or chamber 10 which eliminates wax buildup on other equipment. Because of the ideal drying conditions, tender fruit and vegetables are not exposed to hot air for long periods. This assures lasting beauty and long shelf life for the fruit being dried. The air-heating and conditioning unit of the present invention when used in combination with the enclosed conveying chamber 10, eliminates the need for utilizing outside air such that the humidity and temperature of the chamber may be constantly controlled rendering the drying technique completely consistent in time, temperature and humidity.

Figure 2:
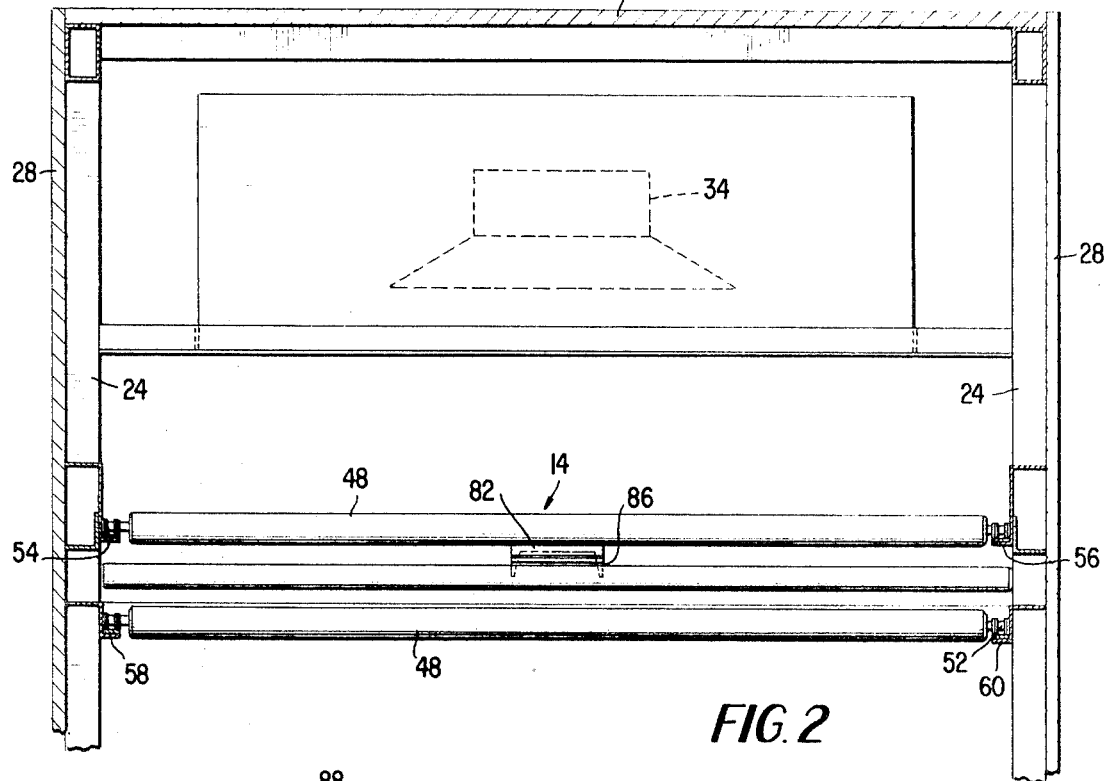
FIG. 2 is a sectional view taken along the line 2-2 of FIG. 1.
Figure 6:
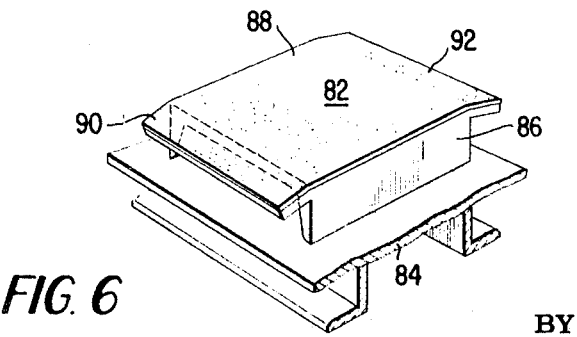
FIG. 6 is a fragmentary perspective view of the turn over mechanism of the present invention.

Referring now to FIGS. 2 and 3, the conveyor 14 is illustrated as consisting of a plurality of rollers 48 having the ends thereof journaled in sprocket chains 50 and 52. The sprocket chains 50 and 52 are drawn along flanges 54 and 56 respectively during the upper run of the conveyor and along flanges 58 and 60 during the lower run of the conveyor. Flanges 54, 56, 58, and 60 may be coated with a low friction material, such as teflon, to provide a smooth surface over which the sprocket chains may be drawn.

Drive means 20 for the conveyor 14 consist basically of a motor 62, drive belt 64 and pulley 66. As shown more clearly in FIGS. 4 and 5, the pulley 66 drives a rod 68 having a pair of sprockets 70 and 72 mounted thereon in spaced relationship for engaging sprocket chains 50 and 52. A pair of discs 74 and 76 are fixedly mounted on rod 68 intermediate sprockets 70 and 72 and have a pair of rodlike members 78 and 80 fixedly mounted on the periphery thereof and diametrically opposed relationship for engagement between rollers 48 at the turn over end portion to assist the conveyor 14 at the turn around portion and to provide a good driving relationship.

As seen in FIGS. 1, 2, 6 and 7 a pair of turn over ramps 82 are provided for rotating the rollers 48 as they proceed along the upper flights of the conveyor. The turn over mechanism 82 is mounted on a beam structure 84 extending between upright members 24 of the closed chamber housing. A short supporting structure 86 rests upon beam structure 84 and is secured thereto by conventional means, such as welding. Fixedly secured to the upper portion of support 86 is a flat portion 88 having a pair of inclined ramps 90 and 92 on opposite ends thereof, such that rollers 48 proceed up ramp 90 across flat portion 88 and down ramp 92. Since flat portion 88 is slightly above the plane of rollers 48, the rollers will rotate as they proceed across the flat portion 88 thus rotating the articles of fruit supported thereon. In this manner, the fruit may be dried on all sides as it proceeds through the chamber.

Figure 8:
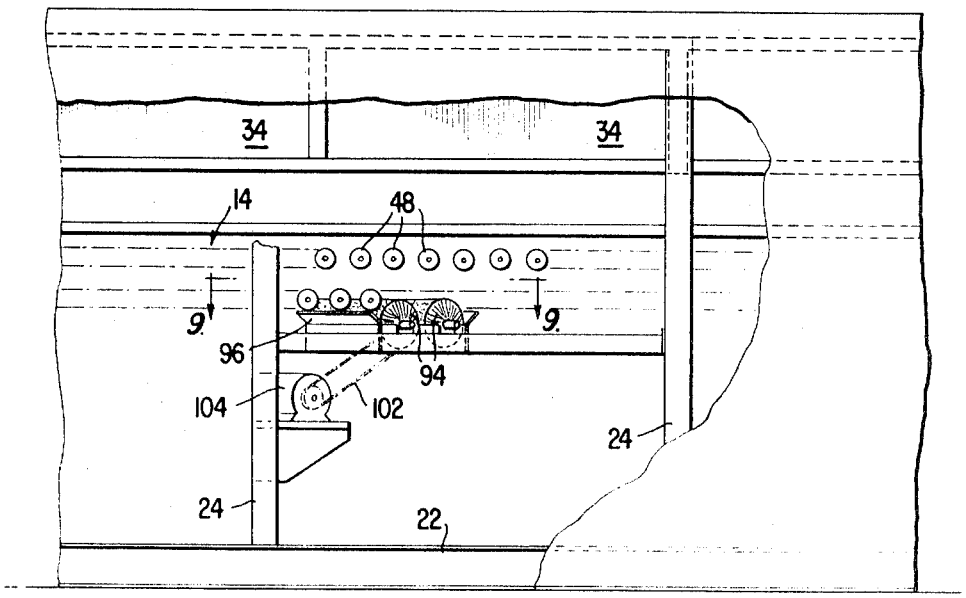
FIG. 8 is a fragmentary side view showing the roller cleaning mechanism.
Figure 9:
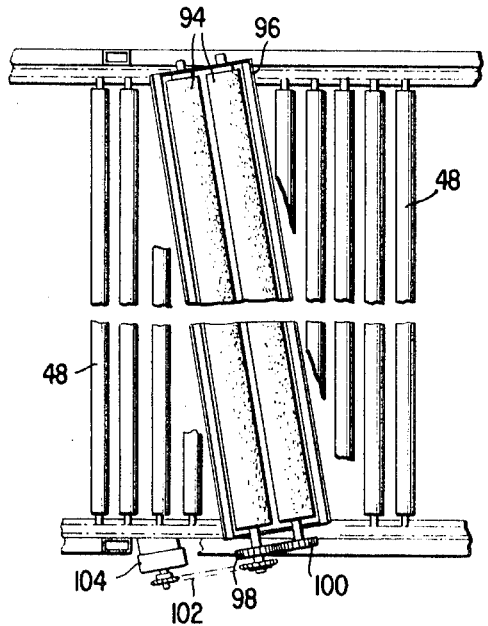
FIG. 9 is a fragmentary sectional view taken along the line 9-9 of FIG. 8.

As the waxed fruit articles pass through the chamber 10 and wax and other debris become deposited upon rollers 14 thus necessitating the continuous cleaning of rollers 14. As shown in FIGS. 8 and 9, a pair of brushes 94 are mounted below the lower run of the conveyor and are angularly disposed to the rollers 48 so as to engage rollers 48 as they pass thereby. The brushes 94 are journal led in a wax collection box 96 and are mounted on a pair of engaged gears 98 and 100. Gear 98 is driven through a chain 102 by a motor 104. Since gears 98 and 100 are in engagement the brushes 94 will rotate in opposite directions thus providing a good scrubbing action on the rollers 48 brought into engagement therewith.

It will be obvious to those skilled in the art that many variations may be made in the embodiments chosen for the purpose of illustrating the present invention, without departing from the scope thereof, as defined by the appended claims.

I claim:

1. Drying apparatus comprising a substantially closed chamber having an inlet end and an outlet end, means for continuously conveying a plurality of articles from the inlet end to the outlet end, said means comprising an endless conveyor consisting of a plurality of rollers journaled at their ends in sprocket chains, sprockets around which said chains pass and means for driving the sprockets; means for drawing air from one end of said chamber, cooling it to cause the moisture contained in it to condense, removing the moisture, reheating the air and returning it to the other end of said chamber, said chamber being closed to the atmosphere so that no outside air is introduced into the system, and means for circulating the heated air across the articles to be dried; said heating and cooling being accomplished by a heat pump type unit; a stationary plate over which the rollers of the conveyor are caused to pass, said plate having ramps which cause the rollers to ride up on and be rotated by their movement over the plate thus turning the articles to be dried for better exposure to the air; and a rotary brush arranged to engage the rollers on the lower run of the conveyor on their lower surfaces, said brush being located in a box which collects the material removed from the rollers and said brush extending at an angle across the conveyor rollers.

2. The combination of claim 1 wherein the means for driving the sprockets includes a pair of discs mounted on the sprocket shaft at opposite sides of the conveyor and a pair of rodlike elements mounted at their ends on the peripheries of the discs and engaging between successive rollers of the conveyor as the discs are rotated to provide an improved driving relationship.